(12) United States Patent
Kawamoto et al.

(10) Patent No.: US 7,206,039 B2
(45) Date of Patent: Apr. 17, 2007

(54) FLAT DISPLAY APPARATUS HAVING PARTITIONED HOUSING

(75) Inventors: Tsutomu Kawamoto, Shizuoka (JP); Shigemori Azuma, Shizuoka (JP); Tokiya Ishikawa, Shizuoka (JP)

(73) Assignee: Pioneer Corporation, Tokyo (JP)

( * ) Notice: Subject to any disclaimer, the term of this patent is extended or adjusted under 35 U.S.C. 154(b) by 229 days.

(21) Appl. No.: 10/880,491

(22) Filed: Jul. 1, 2004

(65) Prior Publication Data
US 2005/0001949 A1 Jan. 6, 2005

(30) Foreign Application Priority Data
Jul. 2, 2003 (JP) ............... P2003-190062

(51) Int. Cl.
G02F 1/1333 (2006.01)
H05K 5/00 (2006.01)
H04N 5/64 (2006.01)

(52) U.S. Cl. ............. 349/59; 361/681; 348/836; 348/839; 349/58

(58) Field of Classification Search ............. None
See application file for complete search history.

(56) References Cited

U.S. PATENT DOCUMENTS 4,652,932 A * 3/1987 Miyajima et al. ........... 348/794
6,198,222 B1 3/2001 Chang
6,494,429 B2 * 12/2002 Tajima ................ 248/473

FOREIGN PATENT DOCUMENTS

| EP | 0 821 385 A2 | 1/1998 |
|---|---|---|
| EP | 1 032 202 A2 | 8/2000 |
| EP | 1 077 443 A1 | 2/2001 |
| EP | 1 174 847 A1 | 1/2002 |
| EP | 1 318 675 A2 | 6/2003 |
| JP | 2001-345586 A | 12/2001 |
| WO | WO 02/25943 A1 | 3/2002 |

* cited by examiner

Primary Examiner—Andrew Schechter
Assistant Examiner—Michael H. Caley
(74) Attorney, Agent, or Firm—Sughrue Mion, PLLC

(57) ABSTRACT

A flat display includes an outer case having a front face frame having a opened rear face and a rear cover covering the opened rear face. The outer case is configured by an electrically conductive chassis board having a front face and a back face; a display panel attached to the front face of the electrically conductive chassis. The back face includes a panel driving unit controlling image formation on the display panel on a basis of an video signal, a source unit having an audio circuit controlling an audio signal and a tuner circuit extracting the audio signal and the video signal, and a power supply unit supplying electric power to the panel driving unit and the source unit. The outer case is partitioned into first housing portion housing the panel driving unit and the power supply unit and second housing portion housing the source unit.

5 Claims, 3 Drawing Sheets

FLAT DISPLAY APPARATUS HAVING PARTITIONED HOUSING

BACKGROUND OF THE INVENTION

1. Field of the Invention

The present invention relates to a flat display apparatus.

2. Description of the Related Art

Recently, as a display panel which is to be used in a flat display apparatus, a plasma display panel (hereinafter, abbreviated to PDP) in which row electrode pairs and column electrode pairs are arranged on inner faces of a pair of substrates that are opposed to each other via a discharge space, discharge cells are formed at intersections of the electrodes, and discharges are caused in the discharge cells to perform a display are being vigorously developed.

A flat display apparatus using such a PDP is employed in an image monitor of a large screen. In an image monitor, components such as a tuner which provides an image source, speakers which produce an audio output, and an audio circuit which controls an audio signal to drive the speakers are configured as separate devices.

Along with popularization of flat display apparatuses having a large screen in general families, also a flat display apparatus which is integrated with a large screen, a tuner, speakers, an audio circuit, and other components has been developed so as to be easily used as a household television receiver.

In such an integrated flat display apparatus, a panel driving unit which controls drawing on a display panel, speakers, an audio circuit which controls an audio signal to drive the speakers, and a tuner circuit which extracts an audio signal and a video signal to be reproduced are incorporated in an outer case which houses the display panel.

Hereinafter, an example of a conventional example of an integrated flat display apparatus will be described in detail with reference to FIG. 1. FIG. 1 shows a conventional integrated flat display apparatus using a PDP.

As shown in FIG. 1, a flat display apparatus 101 comprises an outer case 110 configured by: a front face frame 113 in which a front face cover made of glass or the like is placed in an opening; and a rear cover 111. The outer case 110 incorporates: a PDP 103 which is a flat display panel for displaying an image; a panel driving unit 105 which controls image formation on the PDP 103 on the basis of an input video signal; a source unit 108 comprising an audio circuit 106 which controls output signals to speakers 109 and the like on the basis of an input audio signal, and a tuner circuit 107 which tunes a received radio wave such as a TV wave, and which extracts the video signal to be supplied to the panel driving unit 105, and the audio signal to be supplied to the audio circuit 106; and a power supply unit 102 which supplies an electric power to the above circuits.

The PDP 103 is bonded and fixed by a double-sided adhesive tape to a chassis board 104 which is made of a metal, and which is placed behind the PDP. The chassis board 104 is fastened and fixed by screws or the like to an attachment portion (not shown) formed on the front face frame 113.

The panel driving unit 105, the source unit 108, and the power supply unit 102 are mounted on the back face of the chassis board 104.

Usually, the front face frame 113 is formed by an integral molded product of a synthetic resin. The rear cover 111 is an integral product covering the whole back face of the chassis board 104 on which the power supply unit 102, the panel driving unit 105, the source unit 108, and the like are mounted. In order to prevent leakage of electromagnetic waves from occurring, the rear cover is made of a metal (for example, see JP-A-2001-345586).

An amplifier unit (particularly, a power IC and the like which constitute a power amplifier) which is mounted in the audio circuit 106 generates a considerably large amount of heat. In the above-described structure in which also the audio circuit 106 is incorporated in the housing space of the panel driving unit 105, in order to prevent the heat generated by the audio circuit 106 from affecting the operation of the panel driving unit 105, it is essential to form, in the outer case 110, a heat radiation port for releasing the heat generated by the audio circuit 106 to the outside of the case, and dispose a cooling fan for forcedly discharging the atmosphere at a high temperature in the case, through the heat radiation port to the outside (depending on the cooling capacity of a fan, plural fans may be required).

When a cooling fan is disposed in a flat display apparatus, the production cost is raised by the increased number of components to be mounted. Moreover, there arises a problem in that the housing space in the case is reduced and the size of apparatus is increased. Furthermore, there is the possibility that operation sound of the cooling fan leaks to the outside of the apparatus to impair the quietness required in an audio apparatus, etc.

In the conventional flat display apparatus 101, the metal-made rear cover 111 has the integral structure which covers the whole area of the chassis board 104, and the size of the cover is large. Therefore, the apparatus has another problem in that the weight is increased.

Examples of the problems which are to be solved by the invention are that the necessity of disposing a cooling fan increases the size of an apparatus and impairs the quietness, and that the large size of the metal-made rear cover increases the weight of the apparatus.

SUMMARY OF THE INVENTION

It is an object of the invention to provide with a flat display apparatus including: an outer case including a front face frame having a opened rear face and a rear cover covering the opened rear face, wherein the outer case is configured by an electrically conductive chassis board having a front face and a back face; a display panel attached to the front face of the electrically conductive chassis; a panel driving unit attached to the back face of the electrically conductive chassis board and controlling image formation on a display panel on a basis of an video signal; a source unit attached to the back face of the electrically conductive chassis board and having an audio circuit controlling an audio signal and a tuner circuit extracting the audio signal and the video signal; and a power supply unit attached to the back face of the electrically conductive chassis board and supplying an electric power to the panel driving unit and the source unit, and the outer case is partitioned into a first housing portion housing the panel driving unit and the power supply unit and a second housing portion housing the source unit.

DESCRIPTION OF THE PREFERRED EMBODIMENTS

Hereinafter, a flat display apparatus of a preferred embodiment of the invention will be described in detail with reference to FIGS. 2 and 3.

Figure 1:
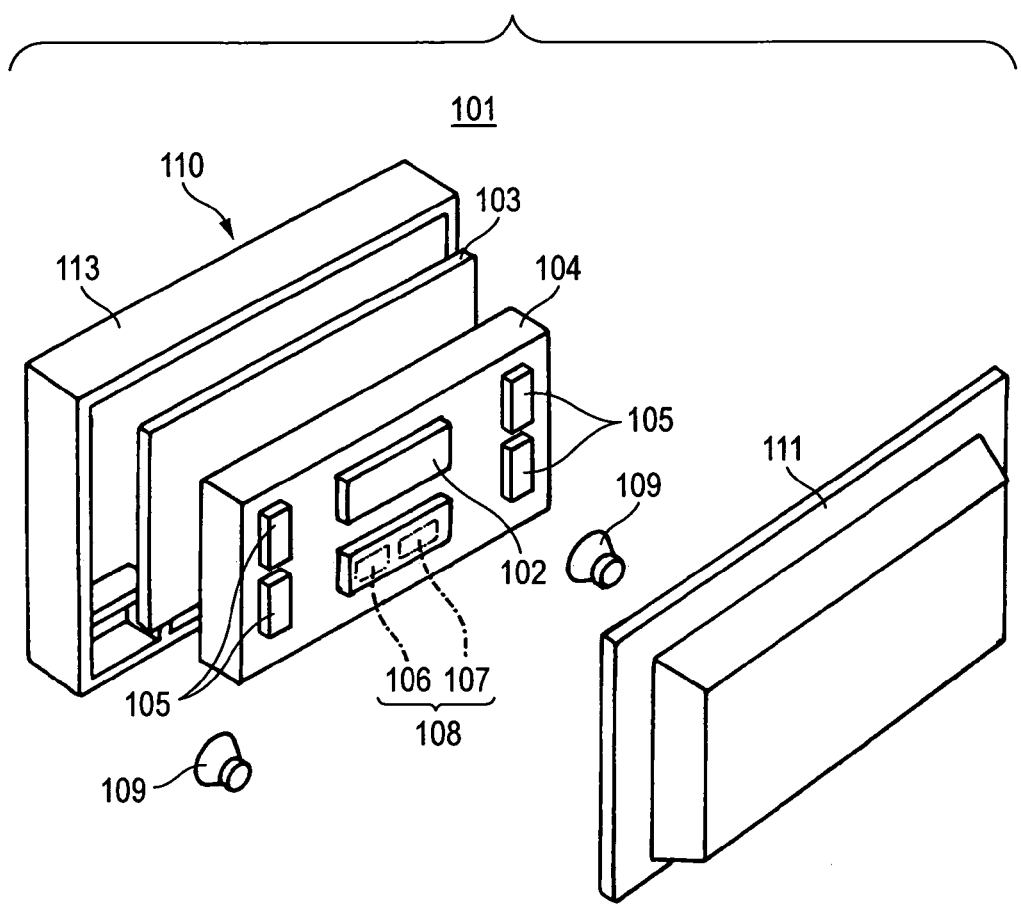
FIG. 1 is an exploded perspective view schematically showing the configuration of a flat display apparatus in the related art.
Figure 2:
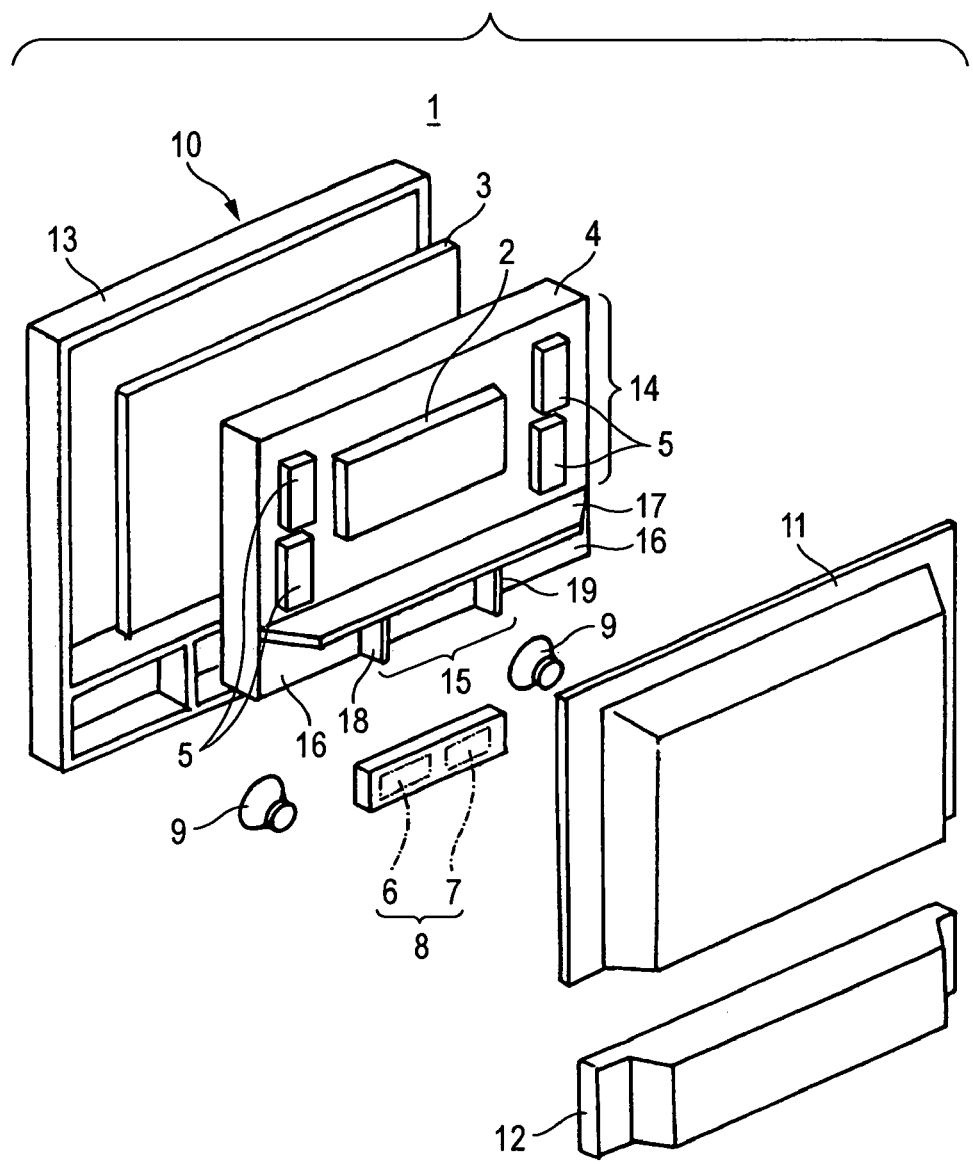
FIG. 2 is an exploded perspective view of an embodiment of the flat display apparatus of the invention.
Figure 3:
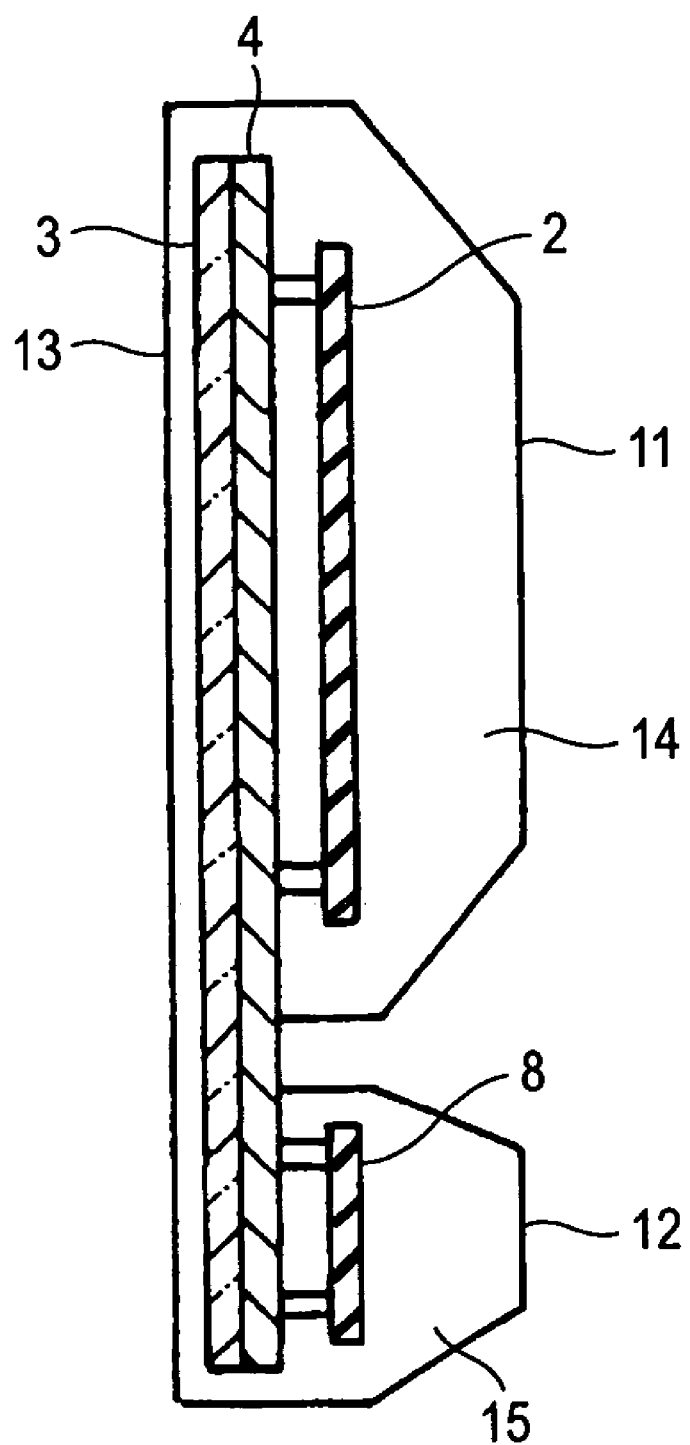
FIG. 3 is a longitudinal section view of the flat display apparatus shown in FIG. 2.

FIG. 2 is an exploded perspective view of a flat display apparatus of the embodiment, and FIG. 3 is a longitudinal section view of the flat display apparatus shown in FIG. 2.

As shown in FIGS. 2 and 3, a flat display apparatus 1 comprises an outer case 10 configured by: a front face frame 13 in which a front face cover made of glass or the like is placed in an opening; and two rear covers 11, 12. The outer case 10 incorporates: a PDP 3 which is a flat display panel for displaying an image; a panel driving unit 5 which controls image formation on the PDP 3 on the basis of an input video signal; a source unit 8 comprising an audio circuit 6 which controls output signals to speakers 9 and the like on the basis of an input audio signal, and a tuner circuit 7 which tunes a received radio wave such as a TV wave, and extracts the video signal to be supplied to the panel driving unit 5, and the audio signal to be supplied to the audio circuit 6; and a power supply unit 2 which supplies an electric power to the above circuits.

The PDP 3 is bonded and fixed by a double-sided adhesive tape to a chassis board 4 which is made of a metal, and which is placed behind the PDP. The chassis board 4 is fastened and fixed by screws or the like to an attachment portion (not shown) formed on the front face frame 13.

The panel driving unit 5, the source unit 8, and the power supply unit 2 are mounted on the back face of the chassis board 4.

In the embodiment, the outer case 10 has a structure which is partitioned into a first housing portion 14 that houses the panel driving unit 5, and a second housing portion 15 that houses the source unit 8. In addition to the housing portions 14, 15, enclosure portions 16, 16 for respectively housing left and right speakers 9, 9 are formed by partitioning.

The housing portions 14, 15 and the enclosure portions 16, 16 are separated from one another by walls 17, 18, 19 upstanding from the back face of the chassis board 4 to which the PDP 3 is to be attached, so that their occupying areas do not overlap with one another.

The second housing portion 15 which houses the source unit 8, and the left and right enclosure portions 16, 16 are laterally arranged in one row so that the second housing portion 15 is positioned between the left and right enclosure portions 16, 16.

The rear covers are configured by the first rear cover which is electrically conductive, and which covers the first housing portion 14, and the second rear cover which is made of a lightweight material, and which covers the second housing portion. The lightweight material means a material which is considerably lighter than that of the first conductive rear cover. For example, the first rear cover is made of a metal, and the second rear cover is made of a resin.

Specifically, the first rear cover 11 which covers the first housing portion 14 must prevent electromagnetic waves emitted from the panel driving unit 5 and the like from leaking, and hence is made of a metal to be provided with electrical conductivity. The second rear cover 12 which covers the second housing portion 15 and the enclosure portions 16, 16 that emit a less amount of electromagnetic waves is considerably lighter than the first rear cover 11 which is made a metal, and made of a resin which is the same material as that of the front face frame 13.

In the thus configured flat display apparatus 1, the audio circuit 6 which generates a larger amount of heat is housed in the second housing portion 15 independent of the panel driving unit 5, and hence the operation of the panel driving unit 5 can be prevented from being affected by heat generated by the audio circuit 6.

As compared with the conventional apparatus in which the panel driving unit 105 and the audio circuit 106 are housed in the same housing portion, therefore, it is possible to omit a cooling fan for preventing the temperature rise in the panel driving unit 5 due to the heat generation in the audio circuit 6. The omission of a cooling fan can eliminate the reduction of the housing space, and reduce the number of components to be mounted, with the result that miniaturization and cost reduction can be realized.

As described above, only the first rear cover 11 covering the first housing portion 14 which must be provided with measures to prevent leakage of electromagnetic waves is made of a metal, and the second rear cover 12 covering the second housing portion 15 is made of a resin. Consequently, the size of the metal-made rear cover which is heavy can be reduced to a required minimum level so as to cover only the first housing portion 14 which is a part of the chassis board 4. As compared with the conventional apparatus in which the whole area of the chassis board is covered by the single metal-made rear cover, therefore, also the weight of the display apparatus of the embodiment can be reduced by the size reduction of metal-made rear cover.

In the embodiment described above, a PDP is used as the flat display panel. The invention is not restricted to this, and may be applied also to a flat display apparatus in which a flat display panel of another kind such as an organic EL display panel or a liquid crystal display panel is mounted.

In the embodiment, for the left and right speakers 9, 9 which are disposed to perform stereo reproduction, the enclosure portions 16, 16 are independently formed in left and right sides, respectively. In order to increase the capacities of the enclosure portions, the design of the structures of the walls defining the enclosure portions 16, 16 may be adequately changed.

Although not shown in the embodiment, in order to prevent the heat generated by the second housing portion 15 from leaking toward the first housing portion 14, a member for improving the sealing property, such as a gasket may be disposed on at least the wall 17 which separates the first housing portion 14 from the second housing portion 15.

In the flat display apparatus 1 of the embodiment, the flat PDP 3 for displaying an image is attached to the front face of the electrically conductive chassis board 4, and components are placed on the back face of the chassis board, the components including: the panel driving unit 5 which controls image formation on the PDP 3 on the basis of an input video signal; the source unit 8 comprising the audio circuit which controls an audio signal, and the tuner circuit which extracts the video signal and the audio signal; and the power supply unit 2 which supplies an electric power to the panel driving unit 5 and the source unit 8, the components being incorporated in the outer case 10 configured by: the front face frame 13 in which the rear face is opened; and the rear cover 11 which covers the opened portion of the front face frame 13. The outer case 10 is partitioned into the first housing portion which houses the panel driving unit and the power supply unit 2, and the second housing portion which houses the source unit. According to the configuration, the audio circuit 6 which generates a larger amount of heat is housed in the housing portion independent of the panel driving unit 5, and hence the operation of the panel driving unit 5 can be prevented from being affected by heat generated by the audio circuit 6.

Therefore, it is possible to omit a cooling fan for preventing the temperature rise in the panel driving unit 5 due to the heat generation in the audio circuit 6. The omission of a cooling fan can eliminate the reduction of the housing space, and reduce the number of components to be mounted, with the result that miniaturization and cost reduction can be realized.

Furthermore, the size of the metal-made rear cover 11 which is used for preventing electromagnetic waves from leaking can be reduced to a required minimum level so as to cover only the first housing portion 14 which is a part of the chassis board 4. As a result of the reduction of the size of the metal-made rear cover 11, also the weight of the display apparatus can be reduced.

What is claimed is:

1. A flat display apparatus comprising:
   an outer case including;
   a front face frame having a opened rear face; and
   a rear cover covering the opened rear face, wherein
   the outer case is configured by
   an electrically conductive chassis board having a front face and a back face;
   a display panel attached to the front face of the electrically conductive chassis board;
   a panel driving unit attached to the back face of the electrically conductive chassis board and controlling image formation on a display panel on a basis of an video signal;
   a source unit attached to the back face of the electrically conductive chassis board and having an audio circuit controlling an audio signal and a tuner circuit extracting the audio signal and the video signal; and
   a power supply unit attached to the back face of the electrically conductive chassis board and supplying an electric power to the panel driving unit and the source unit, and
   the outer case is partitioned into a first housing portion housing the panel driving unit and the power supply unit and a second housing portion housing the source unit.

2. A flat display apparatus according to claim 1, wherein
   the rear cover consists of a first rear cover covering the first housing portion and a second rear cover covering the second housing portion,
   the first rear cover is electrically conductive, and the second rear cover is made of a lightweight material.

3. A flat display apparatus according to claim 2, wherein
   the first rear cover is made of a metal, and
   the second rear cover is made of a resin.

4. The flat display apparatus according to claim 1, wherein the flat display apparatus does not have a cooling fan.

5. The flat display apparatus according to claim 1, wherein the first housing portion and the second housing portion are separated by a wall and wherein the wall comprises a sealing member.

* * * * *